Figure 1:
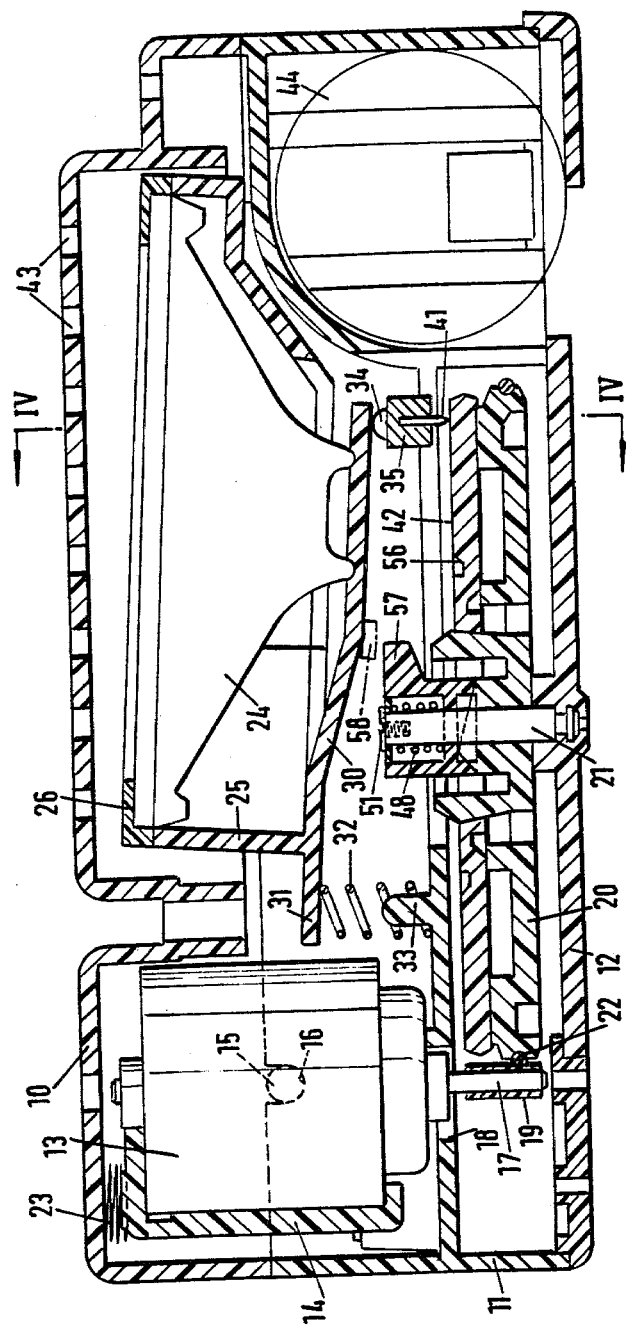

United States Patent [19]

Ngai

[11] 4,347,595
[45] Aug. 31, 1982

[54] RECORD PLAYER

[76] Inventor: Mun-Hay Ngai, 130-132 Argyle St., 3/fl. Flat C., Kowloon, Hong Kong

[21] Appl. No.: 161,700

[22] Filed: Jun. 23, 1980

[30] Foreign Application Priority Data

Jan. 22, 1980 [GB] United Kingdom ............... 8002091
Apr. 1, 1980 [GB] United Kingdom ............... 8010959

[51] Int. Cl.³ ...................... A63H 3/33; G11B 17/06
[52] U.S. Cl. ............................................. 369/67
[58] Field of Search ....................................... 369/67

[56] References Cited

U.S. PATENT DOCUMENTS

| | | | |
|---|---|---|---|
| 3,667,764 | 6/1972 | Nemeth et al. | 369/66 |
| 3,823,946 | 7/1974 | Nakajima | 369/67 |
| 3,984,111 | 10/1976 | Hughes | 369/67 |
| 4,027,887 | 6/1977 | Watanabe | 369/67 |
| 4,150,832 | 4/1979 | Watanabe | 369/67 |
| 4,164,353 | 8/1979 | Hughes | 369/67 |
| 4,198,257 | 4/1980 | Miura | 369/67 |

*Primary Examiner*—Steven L. Stephan
*Attorney, Agent, or Firm*—Robert L. Goldberg

[57] ABSTRACT

The record player comprises a container, a turntable mounted in the container and rotatable by an electric motor, a speaker movable about a pivot towards the turntable under the bias of a spring, and a tone arm having a stylus and being movable with the speaker towards the turntable against the bias of a second spring so as to engage a record in use on the turntable. The second spring biases the tone arm radially outwardly of the turntable. The turntable has a central upstanding boss and a reset member is mounted for angular movement relative to the boss about the axis of the boss. The reset member and the upper end of the boss have cam surfaces biased into engagement with each other by a third spring. The reset member has a radially outwardly extending arm engageable with the speaker or a part connected thereto as the tone arm moves towards the center of the turntable such that when the arm engages the speaker or the part, the member is prevented from rotating with the boss and hence the two cam surfaces are angularly moved relative to one another. The cam surfaces are so shaped that such relative angular movement results in an axial movement of the reset member away from the turntable to pivot the speaker away from the turntable against the bias of the first spring so as to allow the second spring to move the tone arm away from and radially outwardly of the turntable.

12 Claims, 6 Drawing Figures

U.S. Patent  Aug. 31, 1982  Sheet 3 of 4  4,347,595

RECORD PLAYER

The present invention relates to a record player, suitable for a toy, such as inter alia for a doll or a toy dog.

The invention provides a record player suitable for a toy and comprising a container, a turntable mounted in the container and rotatable by an electric motor, a speaker movable about a pivot towards the turntable under the bias of first spring means, a tone arm having a stylus and being movable with the speaker towards the turntable against the bias of second spring means so as to engage a record in use on the turntable, the second spring means biasing the tone arm radially outwardly of the turntable, and means mounted on the turntable and engageable with the speaker or a part connected thereto as the tone arm moves towards the centre of the turntable, said means being operable on engagement with the speaker or the part to pivot the speaker away from the turntable against the bias of the first spring means so as to allow the second spring means to move the tone arm away from and radially outwardly of the turntable.

Preferably, the turntable has a central upstanding boss and said means comprises a member mounted for angular movement relative to the boss about the axis of the boss, the member and the upper end of the boss having cam surfaces biased into engagement with each other by third means, the member having a radially outwardly extending arm engageable with the speaker or the part as the tone arm moves towards the centre of the turntable, the arrangement being such that in use when the arm engages the speaker or the part, the member is prevented from rotating with the boss and hence the two cam surfaces are angularly moved relative to one another, the cam surfaces being so shaped that such relative movement results in an axial movement of the member away from the turntable to pivot the speaker away from the turntable.

Preferably, the cam surfaces are of complementary shape.

Preferably, the speaker is mounted in a pivotable speaker frame which has a lug against which the first spring means acts and an arm connected to the apex of the speaker, said arm moving the tone arm towards the turntable on pivoting of the speaker frame by the first spring means towards the turntable.

Preferably, said means is engageable with a lug which projects from the arm of the speaker frame towards the turntable.

Preferably, the speaker consists of a diaphragm tapering outwardly from the speaker apex, the speaker periphery being connected to a ring connected to the speaker frame.

Preferably, the record player further comprises a record mounted on the turntable and having a playing track terminating in a continuous depression which is deeper than the playing track, the means being engageable with the speaker or the part when the stylus moves into the depression.

Conveniently, the motor has a spindle biased by fourth spring means into driving contact with the periphery of the turntable. In the case, the periphery of the turntable may be provided with a resilient ring against which the motor spindle is biased. The spindle may be provided with a plastics sleeve. The bias of the fourth spring means may be adjustable.

Conveniently, the motor is powered by a battery and the electrical circuit between the battery and the electric motor includes a variable resistor for adjusting the speed of the electric motor.

In one embodiment, the record player may include a switch mechanism comprising first and second switches connected electrically in parallel with each other, the first and second parallel connected switches being connected electrically in series with a battery and the electric motor, said first switch being manually operable and being of a type which when actuated only briefly makes an electrical circuit including the battery and the electric motor and said second switch being operable in response to the position of the tone arm such that it is in an 'off' position only when the tone arm supports the stylus at or adjacent a radially outermost position.

In this case, preferably, the second switch is resiliently biassed towards an 'on' position and a pivotably mounted lever acts between the tone arm and the second switch to move the second switch to an 'off' position when the tone arm supports the stylus at or adjacent a radially outermost position.

Figure 2:
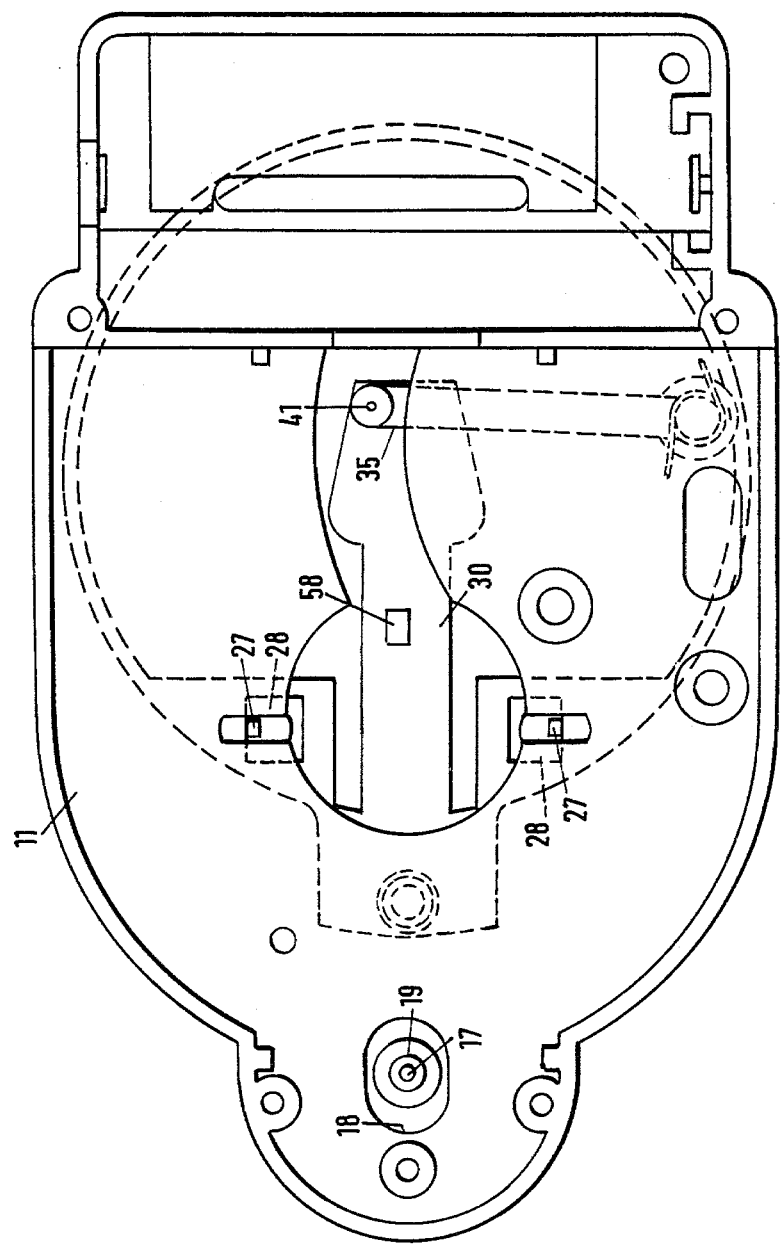
Figure 3:
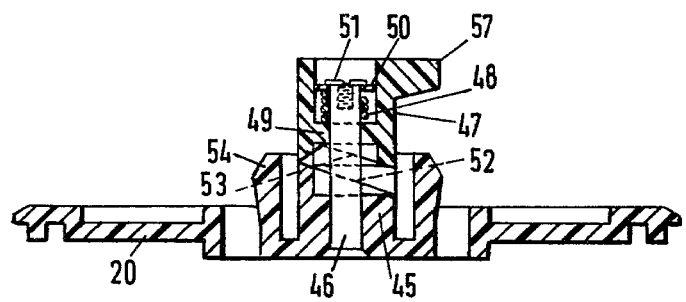
Figure 4:
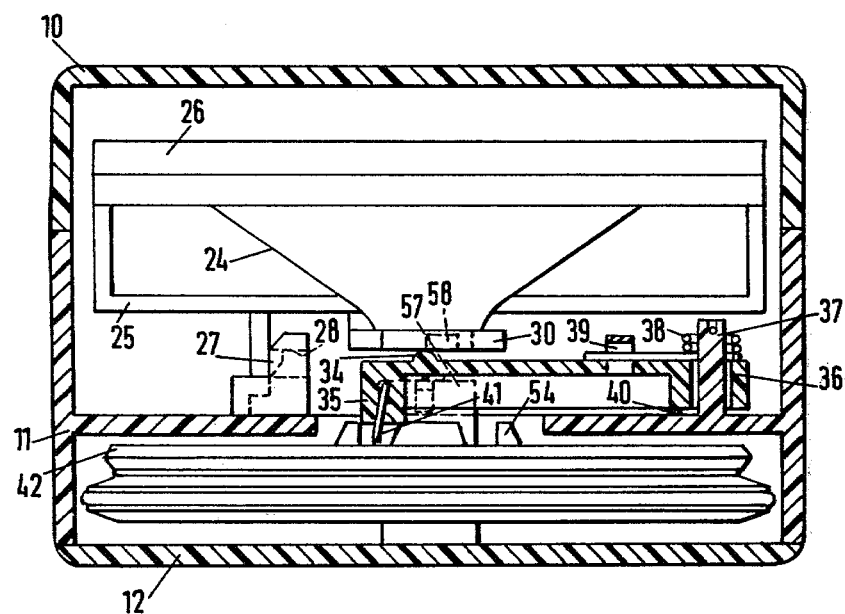
Figure 5:
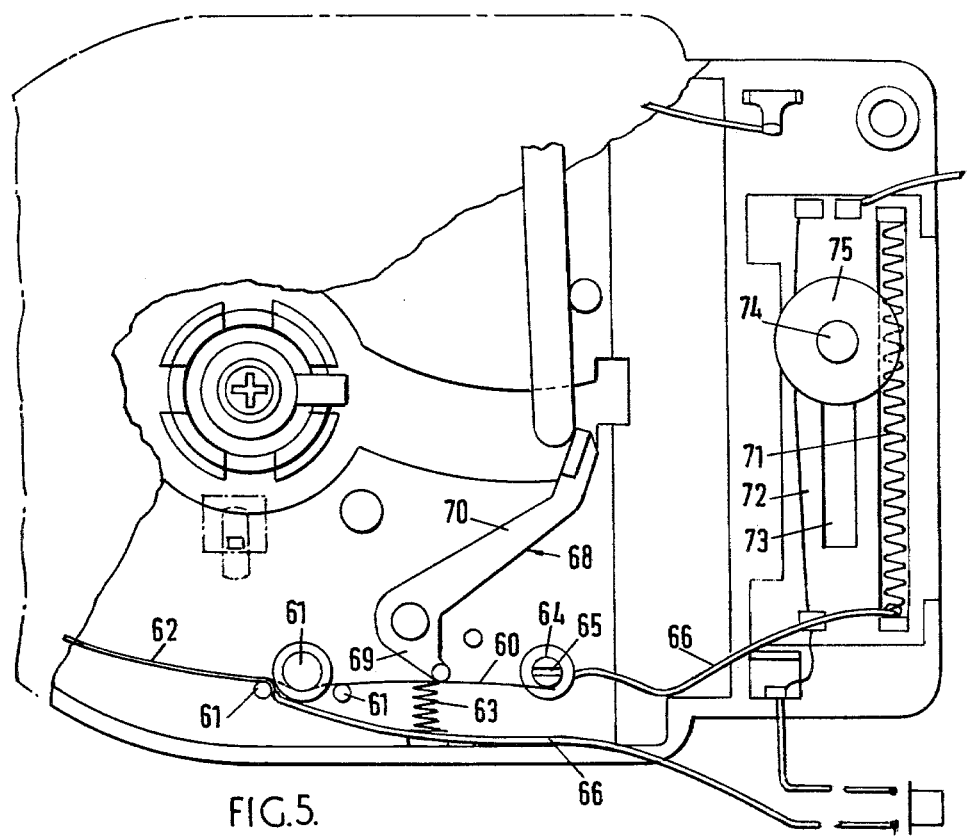
Figure 6:
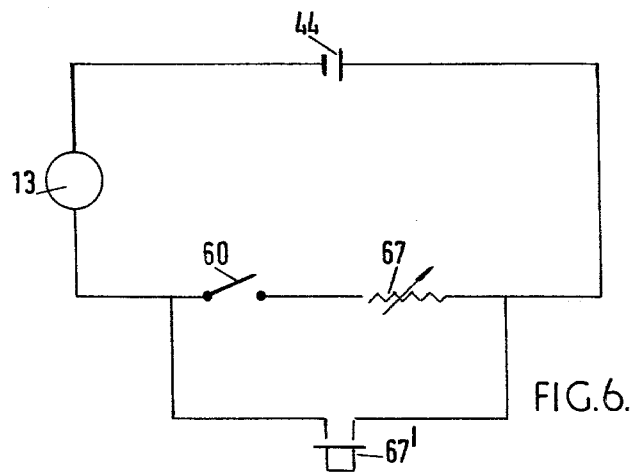

The invention will now be more particularly described with referece to the accompanying drawings wherein:

FIG. 1 is a sectional view of one embodiment of a record player according to the invention, FIG. 2 is a view of the underside of the record player shown in FIG. 1, with the base cover and turntable removed, FIG. 3 is a fragmentary sectional view showing the turntable with the reset member in a raised position, FIG. 4 is a sectional view along line IV—IV of FIG. 1, FIG. 5 is a plan view of an optional switch mechanism, and FIG. 6 is an electrical circuit diagram including the switch mechanism of FIG. 5.

Referring to the drawings, there is shown therein a toy record player comprising a container having a top 10 and a base 11 connected by means of screws (not shown). A base cover 12 is fixed to the base 11.

An electric motor 13 is mounted in a carrier 14 provided with trunnions 15 pivotally mounted on trunnion bearings 16 integral with the base. The motor has a spindle 17 extending through an aperture 18 in the base. The spindle 17 carries a plastics sleeve 19 which in operation drives a turntable 20 rotatably mounted on a spindle 21 fixed to the base cover 12. The periphery of the turntable 20 is provided with a resilient ring 22 against which the motor spindle is biased by a compression spring 23. The bias of spring could be adjustable by a screw (not shown) in the top 10 so as to increase or decrease the contact pressure between the sleeve 19 and the ring 22 and hence to vary the speed of the turntable 20.

A speaker diaphragm 24 is supported in a speaker frame 25 via a diaphragm ring 26 glued to the periphery of the speaker diaphragm.

The speaker frame 25 has two trunnions 27 pivotally supported in trunnion bearings 28 attached to the base 11. The speaker frame 25 has an integral support arm 30 connected to the apex of the speaker diaphragm and an integral lug 31 the underside of which is engaged by a compression spring 32 mounted on a pillar 33 integral with the base 11. The spring 32 urges the lug 31 upwardly away from the turntable 20 thus pivoting the speaker frame 25 and the support arm 30 downwardly towards the turntable 20 to contact a pip 34 on the top of a tone arm 35.

The tone arm 35 has an integral collar 36 at one end thereof by means of which the arm 35 is pivotably mounted on an upstanding pillar 37 integral with the base 11. The tone arm 35 is urged radially outwardly of the turntable by means of a coil spring 38 having a tangential arm at each end thereof. One arm (not shown) bears against a pillar (not shown) on the base, and the other arm bears against an abutment, which may form part of a closed loop 39, on the upper surface of the tone arm thus biasing the arm in a radially outwards direction.

The lower end of the collar 36, i.e. the end adjacent the base, carries a rib 40. The spring 38 is compressed, and thus urges the collar 36 downwardly towards the base 11. The tone arm 35 is thus pivoted upwardly away from the turntable about the rib 40. The end of the tone arm remote from the collar carries a needle or stylus 41 for contacting a record 42 on the turntable. The pivotal movement of the speaker frame 25 towards the turntable caused by the spring 32, ensures that when the stylus 41 contacts the record 42, the pip 34 contacts the support arm 30 attached to the apex of the speaker diaphragm. Thus, sound vibrations picked up from the record by the stylus 41 are transmitted via the tone arm 35, the pip 34, and the support arm 30 to the speaker diaphragm 24 and emitted as sound, which escapes from the top through holes 43.

The electric motor 13 is connected in series with an on/off switch (not shown) and a replaceable battery 44.

The turntable has an upstanding central boss 45 with a central hole accommodating the spindle 46. A tubular reset member 47 is biased into engagement with the upper end of the boss by a compression spring 48 located within the reset member and about the spindle 46, the spring 48 at one end engaging an annular radially inwardly extending flange 49 integral with and adjacent the lower end of the reset member and engaging at the other end a washer 50 which has a diameter slightly less than the internal diameter of the reset member and which is fixed to the upper end of the spindle by a screw 51. The upper end of the boss 45 and the lower end of the reset member 47 have mutually engageable, annular, complementary cam surfaces 52 and 53 which permit relative rotation of the boss and reset member and which are so shaped that on such relative rotation of the boss and reset member, they cause upward movement of the reset member 47 against the bias of the spring 48 for a reason that will be described hereinafter.

The turntable 20 also has a plurality of circumferentially spaced, resiliently-deformable tangs 54. The turntable carries a record 42 having a central aperture engaged by the resilient tangs 54. The multistart playing track of the record terminates in a continuous groove 56 which is deeper than the playing track. The groove has a radially outer bank downwardly inclined towards the spindle and a radially inner bank normal to the surface of the record. Alternatively, the groove may be replaced by a continuous recess having a bank, which is inclined downwardly towards the spindle, only at its radially outer edge, the radially inner edge of the recess terminating at the central hole in the record. The reset member has at its upper end a radially outwardly extending arm 57 engageable with a depending lug 58, which is secured to the underside of the arm 30 of the speaker frame 25 when the stylus 41 moves into the groove 56 or recess at the end of the playing track of the record.

The record player operates as follows:

Current from the battery 44 drives the motor 13 which rotates the turntable 20. The stylus 41 engaged in the playing groove of the record 42 moves radially inwards of the turntable until it slides down the inclined outer bank of the groove 56, during which movement the arm 30 of the speaker frame 25 moves upwards towards the turntable 20 under the bias of spring 32. The arm 57 of the reset member 47 then engages the depending lug 58 on the arm 30 of the speaker frame and further angular movement of the arm 57 and hence the reset member 47 is prevented. Continued rotation of the turntable 20 results in relative angular movement of the boss 45 and reset member 47 and the mutually engageable cam surfaces 52 and 53 of the boss and reset member cause the reset member 47 to move upwardly away from the turntable 20. The reset member 47 engages the arm 30 of the speaker frame and pivots the speaker frame 25 away from the turntable 20 against spring 32 hence freeing the tone arm 35, which can now move away from the turntable under the action of the spring 38, i.e. out of the groove 56 or recess in the record. As soon as the stylus 41 is released from the groove 56 or recess the spring 38 moves the tone arm 35 radially outwards to the outer edge of the record 42. The reset member 47 subsequently returns under the influence of the spring 48 to its initial position. The arm 30 of the speaker frame is pivoted again towards the turntable 20 by the spring 32 until the stylus 41 again enters the groove 56 or recess. Hence the record 42 is played over and over again until the supply to the motor 13 is disconnected by the switch.

The above described record player may, if desired, be provided with a switch mechanism shown in FIGS. 5 and 6. This switch mechanism comprises a metal strip 60 held at one end between three short pillars 61 integral with the base 11 and connected to a wire 62 leading to one terminal of the electric motor 13. The other end of the metal strip bears resiliently, with the aid of a compression spring 63, against a metal sleeve 64 mounted on a pillar 65 integral with the base 11. The metal sleeve 64 is connected to a wire 66 which is connected via a variable resistor 67 to one terminal of the battery 44. The other terminal of the battery 44 is connected to the other terminal of the electric motor 13. A switch 67' which may be located at a position remote from the record player via an extension lead is connected electrically in parallel with the metal strip 60 and variable resistor 67, i.e. is connected between said one end of the strip 60 and the terminal of the resistor 67 electrically remote from the sleeve 64.

A lever 68 having a relatively short arm 69 and a relatively long arm 70 is pivotably mounted on the base 11. The free end of the short arm 69 is engageable with the metal strip 60 and the free end of the long arm 70 is arranged to be engaged by the outer end of the tone arm 35 when the latter is in a radially outer position.

The switch 67' is of a spring type so that upon actuation of this switch only brief contact is made between the two electrical conductors of the extension lead.

This modified record player operates as follows:

The switch 67' is actuated—if desired from a position remote from the record player—and the brief contact thus made between the two electrical conductors of the extension lead temporarily completes the electrical circuit between the battery 44 and electric motor 13. The turntable 20 rotates and the stylus 41 engaged in the playing groove of the record 42 moves radially inwards of the turntable. During initial movement of the stylus 41 the lever 68 is pivoted by the metal strip 60 with the aid of the compression spring 63 until the metal strip 60 engages the sleeve 64. The temporary circuit between the battery 44 and motor 13 is then maintained via the strip 60 and variable resistor 67 until the record has been played once only and the stylus 41 is returned as hereinbefore described to the outer edge of the record. In this latter position the tone arm 35 engages the free end of arm 70 of lever 68 which is hence pivoted such that the arm 69 thereof breaks contact between the metal strip 60 and sleeve 64 to de-energise the electric motor 13. Only upon further actuation of the switch 67' will the electric motor 13 be re-energised to play the record once more.

The variable resistor 67 permits adjustment of the speed of the electric motor 13 and this variable resistor may also be incorporated in the first mentioned embodiment of the record player. The variable resistor 67 comprises a length of coiled resistance wire 71 and a length of uncoiled resistance wire 72 arranged in parallel spaced relationship with each other. The lengths 71 and 72 are each secured at opposite ends to the base 11 and at one end are connected to adjacent terminals. An elongate slot 73 is formed in the base 11 between the lengths 71 and 72. A slider 74 is located in the slot 73 and carries an annular metal contact 75 which bears against adjacent portions of the lengths 71 and 72. Movement of the slider 74 and hence the contact 75 longitudinally of the slot increases or decreases the resistance between the terminals of the resistor 67 to thereby vary the speed of the motor 13.

I claim:

1. A record player suitable for a toy and comprising a container, means for supplying electric power, an electric motor, a turntable mounted in the container and rotatable by said electric motor, a speaker movable about a pivot towards the turntable under the bias of first spring means, a tone arm having a stylus and being movable with the speaker towards the turntable against the bias of second spring means so as to engage a record in use on the turntable, the second spring means biasing the tone arm radially outwardly of the turntable, reset means mounted on the turntable and engageable with the speaker or a part connected thereto as the tone arm moves towards the centre of the turntable, said reset means being operable on engagment with the speaker or the part to pivot the speaker away from the turntable against the bias of the first spring means so as to allow the second spring means to move the tone arm away from and radially outwardly of the turntable and a switch mechanism connected electrically in series with said motor and said means for supplying electric power for automatically interrupting the circuit between said means for supplying electric powers and said motor when said tone arm reaches its radially outermost position, said switch mechanism comprising first and second switches connected electrically in parallel with each other, said first switch being manually operable and being of a type which when actuated only briefly makes an electrical circuit between the means for supplying electric power and said electric motor and said second switch having fixed and movable contacts, means resiliently urging said movable contact toward said fixed contact and a pivotably mounted lever which acts between said tone arm and said movable contact to move said movable contact away from said fixed contact when said tone arm supports said stylus at or adjacent its radially outermost position so that said fixed and movable contacts are separated when but only when said tone arm supports said stylus at or adjacent its radially outermost position.

2. The record player as claimed in claim 1, wherein the turntable has a central upstanding boss and said reset means comprises a member mounted for angular movement relative to the boss about the axis of the boss, the member and the upper end of the boss having cam surfaces biased into engagement with each other by third spring means, the member having a radially outwardly extending arm engageable with the speaker or the part as the tone arm moves towards the centre of the turntable, the arrangement being such that in use when the arm engages the speaker or the part, the member is prevented from rotating with the boss and hence the two cam surfaces are angularly moved relative to one another, the cam surfaces being so shaped that such relative movement results in an axial movement of the member away from the turntable to pivot the speaker away from the turntable.

3. A record player as claimed in claim 2, wherein the cam surfaces are of complementary shape.

4. A record player as claimed in claim 1, wherein the speaker is mounted in a pivotable speaker frame which has a lug against which the first spring means acts and an arm connected to the apex of the speaker, said arm moving the tone arm towards the turntable on pivoting of the speaker frame by the first spring means towards the turntable.

5. A record player as claimed in claim 4, wherein said reset means is engageable with a lug which projects from the arm of the speaker frame towards the turntable.

6. A record player as claimed in claim 4, wherein the speaker consists of a diaphragm tapering outwardly from the speaker apex, the speaker periphery being connected to a ring connected to the speaker frame.

7. A record player as claimed in claim 1, further comprising a record mounted on the turntable and having a playing track terminating in a continuous depression which is deeper than the playing track, the reset means being engageable with the speaker or the part when the stylus moves into the depression.

8. A record player as claimed in claim 1, wherein the motor has a spindle biased by fourth spring means into driving contact with the periphery of the turntable.

9. A record player as claimed in claim 8, wherein the periphery of the turntable is provided with a resilient ring against which the motor spindle is biased.

10. A record player as claimed in claim 8 or claim 9, wherein the spindle is provided with a plastics sleeve.

11. A record player as claimed in claim 8, wherein means are provided for adjusting the bias of the fourth spring means.

12. A record player as claimed in claim 1, wherein the motor is powered by a means for supplying electric power and the electrical circuit between the means for supplying electric power and electric motor includes a variable resistor for adjusting the speed of the electric motor.

* * * * *